(12) United States Patent
Canella et al.

(10) Patent No.: US 11,131,555 B2
(45) Date of Patent: Sep. 28, 2021

(54) METHOD AND APPARATUS FOR OPTIMIZING NAVIGATION ROUTING FOR TRAILERING

(71) Applicant: GM GLOBAL TECHNOLOGY OPERATIONS LLC, Detroit, MI (US)

(72) Inventors: David A. Canella, Pickering (CA); Ralph D. Schlottke, Oshawa (CA); Norman J. Weigert, Whitby (CA); Sean S. Monteiro, Calgary (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 210 days.

(21) Appl. No.: 16/424,170

(22) Filed: May 28, 2019

(65) Prior Publication Data

US 2020/0378777 A1 Dec. 3, 2020

(51) Int. Cl.
*G01C 21/34* (2006.01)
*G01C 21/36* (2006.01)

(52) U.S. Cl.
CPC ..... *G01C 21/3461* (2013.01); *G01C 21/3415* (2013.01); *G01C 21/36* (2013.01)

(58) Field of Classification Search
None
See application file for complete search history.

(56) References Cited

U.S. PATENT DOCUMENTS

| | | | | |
|---|---|---|---|---|
| 10,112,646 B2 * | 10/2018 | Lavoie | | B62D 15/029 |
| 2012/0299724 A1 * | 11/2012 | Kuper | | G01C 21/165 |
| | | | | 340/539.13 |
| 2013/0024060 A1 * | 1/2013 | Sukkarie | | G01C 21/26 |
| | | | | 701/22 |
| 2014/0303847 A1 * | 10/2014 | Lavoie | | B62D 13/06 |
| | | | | 701/41 |
| 2014/0358429 A1 * | 12/2014 | Shutko | | B60D 1/245 |
| | | | | 701/458 |
| 2015/0210317 A1 * | 7/2015 | Hafner | | B62D 15/0275 |
| | | | | 701/41 |
| 2016/0019497 A1 * | 1/2016 | Carvajal | | H04W 4/029 |
| | | | | 701/519 |
| 2016/0245659 A1 * | 8/2016 | Ohba | | B62D 13/06 |
| 2016/0280267 A1 * | 9/2016 | Lavoie | | B62D 13/06 |
| 2017/0123431 A1 * | 5/2017 | Ghneim | | B60W 10/184 |
| 2017/0247032 A1 * | 8/2017 | Lee | | B62D 15/025 |
| 2017/0247054 A1 * | 8/2017 | Lee | | B62D 15/029 |
| 2017/0349213 A1 * | 12/2017 | Abdel-Rahman | | B62D 15/025 |
| 2018/0059682 A1 * | 3/2018 | Thode | | B60W 40/105 |
| 2019/0210418 A1 * | 7/2019 | Hall | | B60D 1/62 |
| 2020/0164890 A1 * | 5/2020 | Shin | | B60W 40/107 |
| 2020/0271469 A1 * | 8/2020 | Willis | | G07C 5/0816 |
| 2020/0324763 A1 * | 10/2020 | Switkes | | G08G 1/161 |

\* cited by examiner

*Primary Examiner* — Dale W Hilgendorf
*Assistant Examiner* — Alexander C. Bost
(74) *Attorney, Agent, or Firm* — Lorenz & Kopf LLP

(57) ABSTRACT

Methods and apparatus are provided for generating a towing preferred navigational route including an input to receive a request for a navigational route wherein the request is indicative of a destination and a tow mode engagement, a memory to store an aggregated segment data wherein the aggregated segment data is generated in response to a plurality of tow enabled vehicles traveling the segment, a processor to generate the navigational route in response to the request for the navigational route and the aggregated segment data, and an output to couple the navigational route for display to a driver.

19 Claims, 5 Drawing Sheets

METHOD AND APPARATUS FOR OPTIMIZING NAVIGATION ROUTING FOR TRAILERING

INTRODUCTION

The present disclosure relates generally to a system of navigational routing for use in a trailering application with a motor vehicle. More specifically, aspects of the present disclosure relate to systems, methods and devices for identification of preferred trailer driving routes using driving data from tow-capable vehicles with an activated tow mode.

Pulling a trailer with a tow vehicle has always been and remains a complicated endeavor for many drivers. Navigation with a trailer nay also be challenging depending on the height and length of the trailer. The ability to maneuver a trailer in traffic or to correct a route in response to obstacles, such as construction, is much more limited on narrow roads or in urban areas. Depending on the size of the trailer, operators may need to avoid steep inclines and descents, sharp turns, narrow roadways and reversing. Low bridges and heavily congested intersections may also present an unpassable obstacle to drivers.

A problem with current navigation systems is that they are typically programmed to provide the quickest route for drivers of passenger vehicles. These navigation systems may be programmed to avoid some navigational obstacles, such as left hand turns, one way streets, bridges, etc., but they do not provide the preferred route for towing of a large trailer. It would be desirable to provide a solution to overcome these problems to provide an optimized method and apparatus for navigation routing for trailering.

The above information disclosed in this background section is only for enhancement of understanding of the background of the invention and therefore it may contain information that does not form the prior art that is already known to a person of ordinary skill in the art.

SUMMARY

Disclosed herein are vehicle navigational routing methods and systems and related control logic for provisioning vehicle systems, methods for making and methods for operating such systems, and motor vehicles equipped with onboard control systems. By way of example, and not limitation, there is presented various embodiments of an automatic navigational routing system for vehicles in a tow mode for trailering are disclosed herein.

In accordance with an aspect of the present invention an apparatus including an input operative to receive a request for a navigational route wherein the request is indicative of a destination and a tow mode engagement, a memory operative to store an aggregated segment data wherein the aggregated segment data is generated in response to a plurality of tow enabled vehicles traveling the segment, a processor operative to generate the navigational route in response to the request for the navigational route and the aggregated segment data, and an output to couple the navigational route for display to a driver.

In accordance with another aspect of the present invention including a global positioning sensor for determining a current location and wherein the navigational route is further determined in response to the current location.

In accordance with another aspect of the present invention wherein the request for the navigational route is indicative of a trailer dimension and wherein the navigational route is determined in response to the trailer dimension.

In accordance with another aspect of the present invention wherein the navigational route is determined in response to a preference indication of vehicles traveling the segment with a tow mode enabled.

In accordance with another aspect of the present invention wherein the requested for the navigational route is generated by a user input coupled to the input.

In accordance with another aspect of the present invention wherein the memory is operative to store a previous traveled segment with tow mode engaged and wherein the navigational route is determined in response to the previously traveled segment.

In accordance with another aspect of the present invention wherein the apparatus is a vehicle with a tow mode operative to tow a trailer.

In accordance with another aspect of the present invention a method including receiving a navigational data indicative of a segment traveled with a tow mode engaged, receiving a navigational route request indicative of a towing operation, generating the navigational route in response to the navigational data, and displaying the navigational route to a driver.

In accordance with another aspect of the present invention wherein further including storing the navigational data in a memory and wherein the navigational data is retrieved by a processor in response to the navigational route request.

In accordance with another aspect of the present invention receiving a current location from a global positioning sensor and wherein the navigational route is determined in response to the current location.

In accordance with another aspect of the present invention wherein the navigational route request is indicative of a destination and wherein the navigational route is determined in response to the destination.

In accordance with another aspect of the present invention including retrieving a previously traveled segment and wherein the navigational route is determined in response to the previously traveled segment.

In accordance with another aspect of the present invention wherein the previously traveled segment is indicative of a preferred towing segment.

In accordance with another aspect of the present invention wherein the navigational route request is indicative of a trailer dimension and wherein the navigational route is determined in response to the trailer dimension.

In accordance with another aspect of the present invention a vehicle navigational system including a receiver operative to receive an aggregated navigational data indicative of a plurality of segments traveled by a plurality of vehicles with a tow mode engaged, a global positioning sensor to determine a current location, a user input to receive a destination and a tow mode indicator, a processor operative to generate a navigational route in response to the aggregated navigational data, the current location, the destination and the tow mode indicator and a display operative to display the navigational route to a driver.

In accordance with another aspect of the present invention wherein the navigational route is indicative of a preferred route for towing a trailer.

In accordance with another aspect of the present invention wherein the user interface is further operative to receive a trailer dimension and wherein the navigational route is determined in response to the trailer dimension.

In accordance with another aspect of the present invention including a memory operative to store a map data and a previously traveled segment and wherein the navigational route is determined in response to the map data and the previously traveled segment.

In accordance with another aspect of the present invention wherein the display is further operative to display an alternate navigational route wherein the alternate navigational route is generated in response to a segment traveled by a plurality of vehicles without a tow mode engaged.

In accordance with another aspect of the present invention including a transmitter operative to transmit a previously traveled tow mode enabled segment.

BRIEF DESCRIPTION OF THE DRAWINGS

The exemplary embodiments will hereinafter be described in conjunction with the following drawing figures, wherein like numerals denote like elements, and wherein.

The exemplifications set out herein illustrate preferred embodiments of the invention, and such exemplifications are not to be construed as limiting the scope of the invention in any manner.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
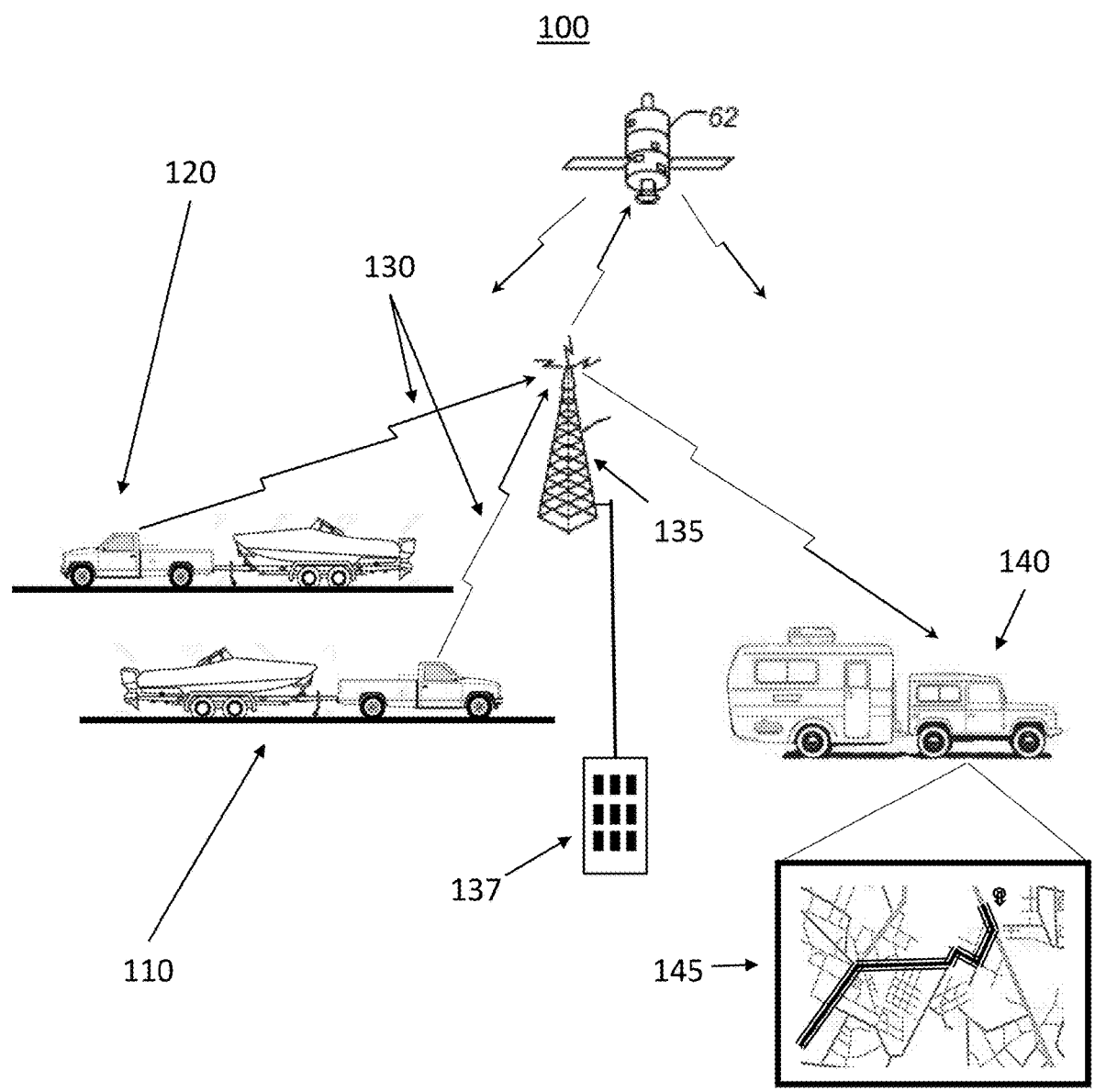
FIG. 1 shows an environment for the method and apparatus for optimizing navigation routing for trailering in a motor vehicle according to an exemplary embodiment of the present disclosure.

Turning now to FIG. 1 an environment for the method and apparatus for optimizing navigation routing for trailering 100 in a motor vehicle according to an exemplary embodiment of the present disclosure is shown. The exemplary embodiment 100 includes a first towing vehicle 110, a second towing vehicle 120, a radio frequency (RF) transceiver 135, a satellite 62, a third towing vehicle 140 and a navigational route 145 according to an exemplary method if the present disclosure.

In this exemplary embodiment, the first towing vehicle 110 and the second towing vehicle are operating with a tow mode engaged. A tow mode, or haul mode, in a vehicle may be operative to adjust the vehicle's transmission shift patterns which may include increasing shift points to higher engine revolutions per minute (RPM) or downshift earlier when assist in braking. A tow mode may further increase torque, engage engine braking operations, reduce noise and vibration control features, adjust fuel economy algorithms, etc. During tow mode operation, the first towing vehicle 110 and the second towing vehicle 120 are operative to collect driving data, such as route information and route segments traveled, and to transmit this driving data via RF transmission 130 to the RF transceiver 135. The driving data is coupled from the RF transceiver 135 to a central processing operation 137.

The central processing operation 137 is operative to collect driving data, such as route information, from tow-capable vehicles when tow-haul mode is activated. The central processing operation 137 is then operative to compile this collected data into a trailering data set and to transmit this trailering data set to tow enabled vehicles, such as the third towing vehicle 140.

In an exemplary embodiment, the third towing vehicle 140 may perform a route-planning algorithm in response to a request of a vehicle user. The third towing vehicle 140 first determines if the vehicle has a tow mode activated. If the tow mode is activated, the third towing vehicle 140 is then operative to use the trailering data set along with other navigational information, such as global positioning system (GPS) information received from a satellite 62 to generate a navigational route 145. The route planning algorithm may then identify routes that are preferred by trailer drivers and those which can reasonably be expected to simplify the trailering task in response to the trailing data. The route planning algorithm may consider aggregate towing/hauling route data, time of day, road geometry, current weather conditions, construction information and topographical information. Additional collected data may include vehicle sensor data including the suspension, brake, wheel position, throttle and gear selector data as part of the route selection algorithm or for weather and road condition estimation. The route planning algorithm may be operative to generate the navigational route 145 for the towing vehicle in order to minimize left turns, minimize complex intersections, minimize small lane width, minimize few lane numbers, minimize multiple curves, and minimize turn radius in response to trailer size and overhead clearance.

Figure 2:
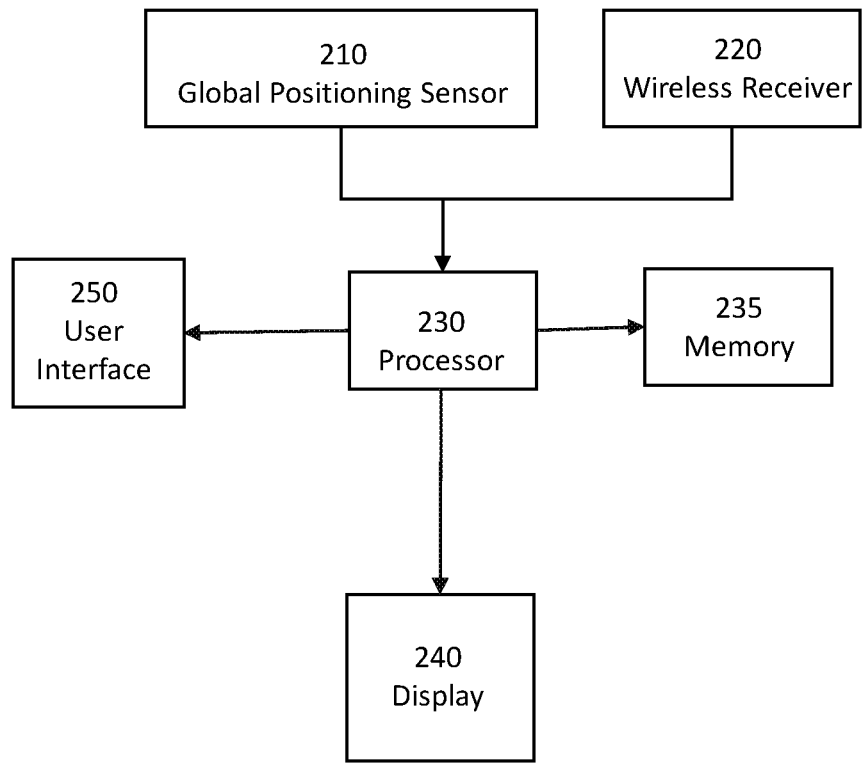
FIG. 2 shows a block diagram illustrating a system for optimizing navigation routing for trailering in a motor vehicle according to an exemplary embodiment of the present disclosure.

Turning now to FIG. 2, a block diagram of a system for optimizing navigation routing for trailering in a motor vehicle 200 according to an exemplary embodiment of the present disclosure is shown. The exemplary system 200 includes a global positioning sensor (GPS) 210, a wireless receiver 220, a processor 230, a memory 235, a user interface 250 and a display 240. The processor is operative to receive map data and route data via the wireless receiver 220. This data may be transmitted from a central processing operation or the like. The map data may include updated map data which may be used to update map data stored on the memory 235. The route data may be indicative of traffic conditions proximate to the motor vehicle. For example, the route data may be indicative of road closures, traffic speed, detours, and may be generally based on the flow of vehicles within the route.

In this exemplary embodiment, the route data may also include a subset of route data indicative to trailering route data. This trailering route data is indicative of preferred routes used by vehicles having a tow mode active during the traversing of the route. For example, the route data may indicate that Main street is a preferred route for crossing a particular town, but the trailing route data indicates that vehicles having a tow mode engaged preferred using Second street. In may be inferred from this dichotomy that Second street is a preferred route for vehicles pulling trailers.

The processor 230 is further operative to receive location information from the GPS sensor 210. The GPS sensor 210 receives one or more satellite signals from GPS satellites indicative of a satellite position and a time of transmission. In response to signals from two or more satellites, the GPS sensor 210 is operative to predict a location of the GPS sensor 210. The GPS sensor 210 is then operative to generate a location data in response to the location prediction and to couple this data to the processor 230.

The user interface 250 is operative to receive information from a vehicle user, such as the driver. This information may include navigational destination information and tow mode selection. Tow mode selection may be indicative of whether a vehicle is towing a trailer as the tow mode is operative to adjust the driving characteristic of a vehicle to compensate for the towing of the trailer. The information received from the user may also include trailer dimensions. These trailer dimensions may be directly received, such as "14 foot trailer", or may be estimated in response to a user selection of "small trailer," "5$^{th}$ wheel" or the like. The processor 230 may be operative to estimate the dimensions of the trailer in response to vehicle performance and the indication of tow mode selection from the user interface 250.

The processor 230 is operative to receive user preference data from the user interface 250. In the instance where the preference data is indicative of a navigational destination, the processor 230 is operative to generate a navigational route in response to the navigational destination, the location data from the GPS sensor 210, the route data from the wireless receiver 220 and the map data from the memory 235. In addition, if the preference data from the user interface 250 is indicative of a tow mode being employed by the vehicle. If the tow mode is employed, the processor 230 may be further operative to use the trailering route data received via the wireless receiver 220 to generate the navigational route. If the tow mode is not employed, the processor 230 may elect to not use the trailer route data in generating the navigational route.

Once the navigational route is generated by the processor 230 it may be coupled to the display 240 for display on an infotainment system or the like. The display 240 may be operative to display the navigational route to the driver. The display 240 may be further indicative of a trailering route preference being used to generate the navigational route. The processor 230 may be further operative to generate a first navigational route using the trailer route data and a second navigational route not using the trailer route data. The display 240 and the user interface may then be employed to allow the user to select one of the desired routes.

Figure 3:
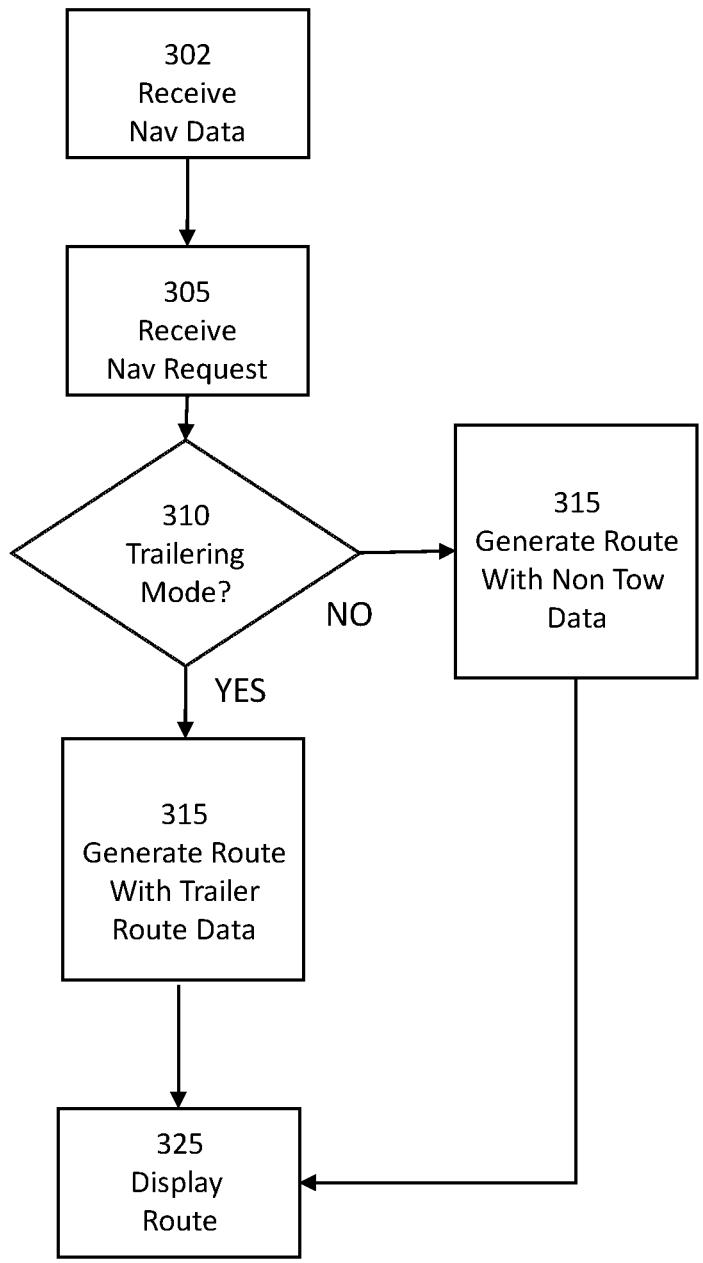
FIG. 3 shows a flow chart illustrating a method for optimizing navigational routing for trailering in a motor vehicle according to an exemplary embodiment of the present disclosure.

Turning now to FIG. 3, a flow chart illustrating an exemplary method for optimizing navigation routing for trailering in a motor vehicle 300 according to an exemplary embodiment of the present disclosure is shown. In this exemplary embodiment the method is first operative to receive 302 navigation data from a navigational data source. The navigational data may include trailering route data. The trailering route data is indicative of preferred routes for pulling a trailer. The trailering data is generated by analyzing route data traveled by vehicles with a trailering mode engaged. This tow mode route data may be compared to non-tow mode route data to see where vehicles towing a trailer deviate from the non-tow preferred routes. For example, non-two vehicles may show a preference to cross a river at a first bridge, wherein vehicles with tow mode engaged show a preference to cross a river at a second bridge. An assumption may be made that there is some feature of the first bridge that makes it unattractive to a driver of a vehicle towing a trailer. The trailering route data would then indicate a preference for the second bridge.

The method is then operative to receive 305 a navigation request via a user interface from a vehicle user. The navigation request may include a destination and route preferences, such as highway avoidance, toll road avoidance, etc. The method is then operative to determine if the motor vehicle has trailering mode active 310. If trailering mode is not active, indicating that a trailer is not being towed, the method is operative to generate 315 the navigation route using the current location, destination, and route preferences. The method is then operative to display the route 325 to the user via a user display or the like.

If the trailer mode is active 310 on the motor vehicle, the method is operative to generate the navigation route using the trailering route data, current location, destination, and route preferences. The method may further be operative to receive trailer dimensions via the user interface and to user a subset of the trailering route data corresponding to similar sized trailers for generating the navigation route. The method is then operative to display the route 325 to the user via a user display or the like.

Figure 4:
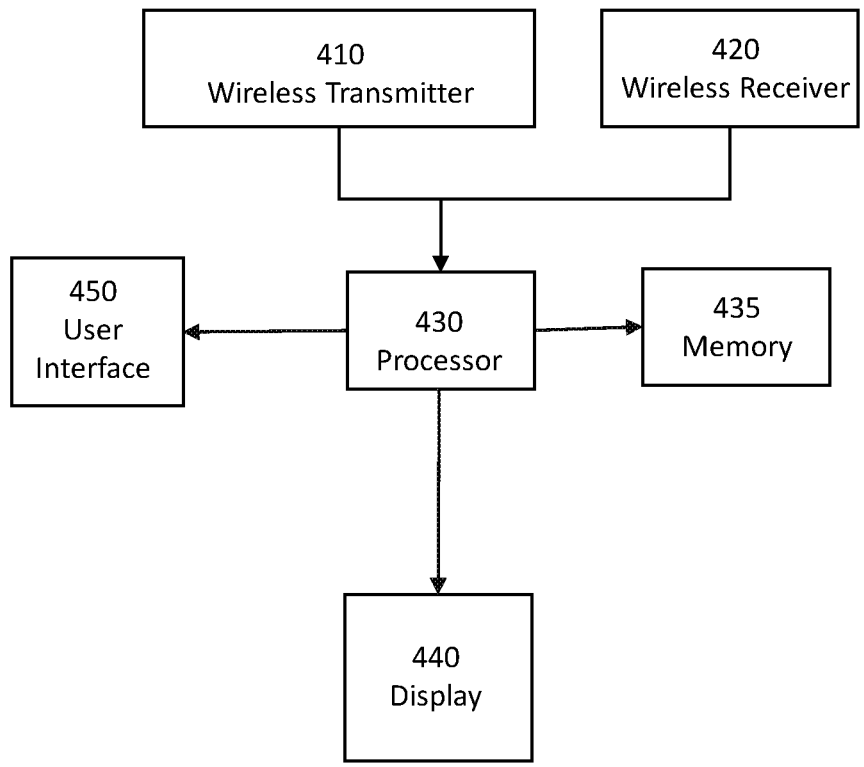
FIG. 4 shows block diagram illustrating a system for optimizing navigational routing for trailering in a motor vehicle according to another exemplary embodiment of the present disclosure.

Turning now to FIG. 4, an apparatus for generating a trailer routing data for optimized navigation routing for trailering in a motor vehicle 400 according to an exemplary embodiment of the present disclosure is shown. The apparatus may include a wireless transmitter 410 and wireless receiver 420, a processor 430, a memory 435 a user interface 450 and a display 440.

The wireless receiver 420 is operative to receive data from vehicles via a wireless network, such as a cellular network, related to navigational routes traveled by the vehicles. The data may include time of day, route segments traversed, start of trip, destination, etc. In this exemplary embodiment, also included in this data is an indicator of tow mode engagement by the vehicle during operation. The wireless receiver 420 is also operative to receive requests from vehicles requesting navigational route data. These requests for navigational route data may be further indicative of a tow mode engaged by the requesting vehicle. The wireless receiver 420 is operative to couple the data to a processor 430.

The processor 430 is operative to receive data from wireless receiver 420. The processor 230 then compiles and organizes data received with respect to segment routes. The compiled data may be further indicative of driving data detailing route information from tow-capable vehicles when tow-haul mode is activated. The processor 430 is then operative to aggregate data to identify routes that are preferred by trailer drivers and those which can reasonably be expected to simplify the trailering task. Aggregated data may include the number of times the user has selected this path at a given time of day while in tow-haul mode, the number of times a route segment has been driven by a vehicle with tow-haul mode active, and the number of times a route segment has been driven by a vehicle at the current time of day with tow-haul mode active. The processor 430 is operative to store the aggregated data on the memory 435 for later retrieval. The aggregated data may be added to, altered or abbreviated in response to a user command generated at a user interface 450. The aggregated data may be displayed on the display 440 in response to a user command generated at the user interface 450.

The processor 430 may generate a navigational path in response to a received request from a vehicle requesting navigational route data. The request may be indicative of a request from a vehicle with tow mode engaged indicating that the vehicle is towing a trailer. The request may further include the dimensions of the trailer. If a tow mode is indicated, the navigational path may be generated in response to the aggregated data as well as the total number of route segments between start location and destination location, the number of left turns in the route, the number of curves with radius less than a threshold amount in the route, the minimum lane width in route segment, and the trailer dimensions. The processor 430 may consider these factors for a number of navigational paths and present the navigational path alternatives with trailer compatibility factor. The trailer compatibility factor can be indicative of the ease of navigating with a trailer in tow. If an automatic route selection is made by the processor 430, potential route paths at a given time of day with the compatibility factor may be selected as easiest to trailer.

Figure 5:
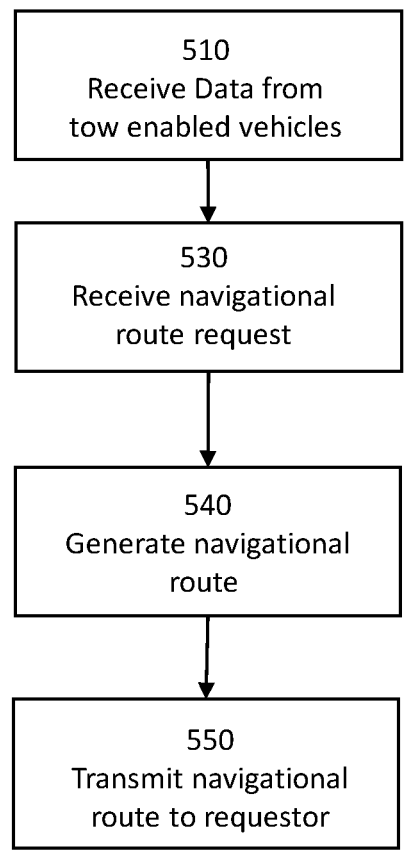
FIG. 5 shows a flow chart illustrating a method for optimizing navigational routing for trailering in a motor vehicle according to another exemplary embodiment of the present disclosure.

Turning now to FIG. 5, a flow chart illustrating a method for generating a trailer routing data for optimized navigation routing for trailering in a motor vehicle 500 according to an exemplary embodiment of the present disclosure is shown. The method is first operative to receive 510 data from a tow enabled vehicle via a wireless network. The data may include route segments traveled by the motor vehicle 500 while tow mode was enabled. The data may further include time of day when the route segments were traveled, number of times the route segment was traveled, and route segments traveled while tow mode was not engaged. The method is then operative to aggregate the received data with additional stored in a memory and to store the aggregated data in the memory.

The method is then operative to receive a request 530 for a navigational route from a motor vehicle where the request is indicative of a starting point, a destination, a time of day and an indicator of the motor vehicle performing a towing application. The request may further include trailer dimensional data and other characteristics for a trailer being towed.

The method is then operative to generate 540 the navigational route in response to the received request and the aggregated data stored on the memory. The navigational route may be determined also in part to features of the proposed navigational route such as lane widths, speed limit and number of left turns.

In this exemplary embodiment of the present disclosure, a number of navigational routes may be determined in response to the requested with a route score being determined for each determined navigational route. The route score may be determined in response to a route score formula which takes into account demonstrated preferences of the motor vehicle operator as well as preferences of other vehicle operators employing tow mode in their motor vehicles.

$$\text{Route Score}(t) = \sum_{i=1}^{n_s} \left[ \left( \frac{\bar{x}_i + x_{iPersonal}}{\bar{x}_i} \right) * \frac{g * (w_l - w_t)}{(n_{lt} + n_c)} + \bar{x}(t)_i \right]$$

In the route score formula $x_{Personal}$ is the number of times the current driver has selected this path at a given time of day while in tow mode, x is the number of times a route segment has been driven by a vehicle with tow-haul mode active, x(t) is the number of times a route segment has been driven by a vehicle at the current time of day with tow-mode active, $n_s$ is the total number of route segments between start and destination, $n_{lt}$ is the number of left turns (count), $n_c$ is the number of curves with radius less than a threshold amount (count), $w_l$ is minimum lane width in route segment (m), and $w_t$ is trailer width (m).

Once the navigational routes are generated and route scores are determined for each navigational route, the navigational routes with route scores may be transmitted 550 to the requesting motor vehicle. This facilitates the motor vehicle operator selecting a navigational route with ease of traveling with a trailer as one of the characteristics of each navigational route. Alternatively, the navigational route with the highest route score may be transmitted to the motor vehicle.

While at least one exemplary embodiment has been presented in the foregoing description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiments. It should be understood that various changes can be made in the function and arrangement of elements without departing from the scope of the disclosure as set forth in the appended claims and the legal equivalents thereof.

What is claimed is:

1. An apparatus comprising:
   an input device configured to receive a request for a navigational route wherein the request is indicative of a destination and a tow mode engagement;
   a memory operative to store an aggregated segment data wherein the aggregated segment data is indicative of a preferred towing segment generated in response to a plurality of vehicles with a tow mode enabled traveling the preferred towing segment;
   a processor operative to generate the navigational route in response to the request for the navigational route and the aggregated segment data; and
   an output device configured to receive the navigational route from the processor and to display the navigational route to a driver, wherein the output device is further operative to display an alternate navigational route generated in response to an alternate segment traveled by a plurality of vehicles without a tow mode engaged.

2. The apparatus of claim 1 further comprising a global positioning sensor operative to determine a current location and wherein the navigational route is further determined in response to the current location.

3. The apparatus of claim 1 wherein the request for the navigational route is indicative of a trailer dimension and wherein the navigational route is determined in response to the trailer dimension.

4. The apparatus of claim 1 wherein the processor is configured to determine the navigational route in response to a preference indication of vehicles traveling the segment with a tow mode enabled.

5. The apparatus of claim 1 wherein the request for the navigational route is generated by a user input coupled to the input device.

6. The apparatus of claim 1 wherein the memory is operative to store a previous traveled segment with tow mode engaged and wherein the navigational route is determined in response to the previously traveled segment.

7. The apparatus of claim 1 wherein the apparatus comprises a vehicle with a tow mode operative to tow a trailer.

8. A method comprising:
  receiving navigational data indicative of aggregated segment data generated in response to a plurality of tow enabled vehicles traveling the segment a with a tow mode engaged via an input device;
  receiving via a user interface a navigational route request indicative of a towing operation;
  generating the navigational route in response to the navigational data using a processor; and
  displaying the navigational route to a driver on a display device, wherein the display device is further operative to display an alternate navigational route generated in response to an alternate segment traveled by a plurality of vehicles without a tow mode engaged.

9. The method of claim 8 further comprising storing the navigational data in a memory and wherein the navigational data is retrieved by the processor in response to the navigational route request.

10. The method of claim 8 further comprising receiving a current location from a global positioning sensor and wherein the navigational route is determined in response to the current location.

11. The method of claim 8 wherein the navigational route request is indicative of a destination and wherein the navigational route is determined in response to the destination.

12. The method of claim 8 further comprising retrieving a previously travelled segment and wherein the navigational route is determined in response to the previously travelled segment.

13. The method of claim 12 wherein the previously travelled segment is indicative of a preferred towing segment.

14. The method of claim 8 wherein the navigational route request is indicative of a trailer dimension and wherein the navigational route is determined in response to the trailer dimension.

15. A vehicle navigational system comprising:
  a receiver operative to receive aggregated navigational data indicative of aggregated segment data generated in response to a plurality of tow enabled vehicles traveling the segment with a tow mode engaged;
  a global positioning sensor operative to determine a current location;
  a user input operative to receive a destination and a tow mode indicator;
  a processor operative to determine a navigational route in response to the aggregated navigational data, the current location, the destination and the tow mode indicator; and
  a display operative to display the navigational route to a driver, wherein the display is further operative to display an alternate navigational route generated in response to an alternate segment traveled by a plurality of vehicles without a tow mode engaged.

16. The vehicle navigational system of claim 15 wherein the navigational route is indicative of a preferred route for towing a trailer.

17. The vehicle navigational system of claim 15 wherein the user input is further operative to receive a trailer dimension and wherein the navigational route is determined in response to the trailer dimension.

18. The vehicle navigational system of claim 15 further comprising a memory operative to store a map data and a previously travelled segment and wherein the navigational route is determined in response to the map data and the previously travelled segment.

19. The vehicle navigational system of claim 15 further comprising a transmitter operative to transmit a previously travelled tow mode enabled segment.

* * * * *